United States Patent
Bajaj et al.

(10) Patent No.: US 11,706,266 B1
(45) Date of Patent: Jul. 18, 2023

(54) SYSTEMS AND METHODS FOR ASSISTING USERS OF ARTIFICIAL REALITY PLATFORMS

(71) Applicant: META PLATFORMS TECHNOLOGIES, LLC, Menlo Park, CA (US)

(72) Inventors: Meekal Bajaj, San Francisco, CA (US); Tian Lan, Mountain View, CA (US); Andrew John Hardy Liebchen, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/690,400

(22) Filed: Mar. 9, 2022

(51) Int. Cl.
- *H04L 65/403* (2022.01)
- *H04L 65/1069* (2022.01)
- *G06T 19/00* (2011.01)
- *H04L 65/1096* (2022.01)
- *H04L 65/401* (2022.01)
- *H04L 65/1093* (2022.01)

(52) U.S. Cl.
CPC .......... *H04L 65/403* (2013.01); *G06T 19/006* (2013.01); *H04L 65/1069* (2013.01); *H04L 65/1093* (2013.01); *H04L 65/1096* (2013.01); *H04L 65/4015* (2013.01)

(58) Field of Classification Search
None
See application file for complete search history.

(56) References Cited

U.S. PATENT DOCUMENTS

| | | | | |
|---|---|---|---|---|
| 8,012,023 | B2* | 9/2011 | Gates, III | G06F 3/011 463/31 |
| 8,388,450 | B1* | 3/2013 | McGuirk | A63F 13/795 463/42 |
| 9,363,569 | B1* | 6/2016 | van Hoff | H04N 13/271 |
| 9,851,793 | B1 | 12/2017 | Van Hoff et al. | |
| 10,504,277 | B1* | 12/2019 | Haitani | H04N 7/147 |
| 10,596,473 | B2* | 3/2020 | Nakamura | A63F 13/73 |
| 10,657,701 | B2* | 5/2020 | Osman | A63F 13/25 |
| 10,921,590 | B1 | 2/2021 | Wieczorek | |
| 11,165,837 | B2* | 11/2021 | Escudero | H04L 65/1093 |
| 2002/0086732 | A1* | 7/2002 | Kirmse | A63F 13/12 463/42 |
| 2012/0122570 | A1* | 5/2012 | Baronoff | A63F 13/792 463/31 |
| 2012/0263154 | A1* | 10/2012 | Blanchflower | G06T 19/006 455/414.1 |

(Continued)

*Primary Examiner* — Backhean Tiv
(74) *Attorney, Agent, or Firm* — Greenberg Traurig, LLP

(57) ABSTRACT

The disclosed computer-implemented method may include creating, by an artificial reality platform, a link configured to invite an invitee user to join an inviter user in an instance of an artificial reality application at a current location of the inviter user in the instance. The method may additionally include sharing the link, by the artificial reality platform, with the invitee user, and receiving, by the artificial reality platform, an indication of an activation of the link by the invitee user. The method may further include launching, by the artificial reality platform at least partly in response to receipt of the indication, the instance in an artificial reality device of the invitee user at the current location of the inviter user. Various other methods, systems, and computer-readable media are also disclosed.

20 Claims, 7 Drawing Sheets

(56) References Cited

U.S. PATENT DOCUMENTS

| | | | |
|---|---|---|---|
| 2013/0130762 A1* | 5/2013 | John | A63F 13/48 |
| | | | 463/43 |
| 2015/0058102 A1* | 2/2015 | Christensen | G11B 31/006 |
| | | | 705/14.6 |
| 2016/0035016 A1* | 2/2016 | Spio | G06Q 50/01 |
| | | | 705/27.2 |
| 2016/0155187 A1* | 6/2016 | Paulrajan | G06Q 30/0643 |
| | | | 705/27.2 |
| 2016/0203646 A1* | 7/2016 | Nadler | H04N 13/275 |
| | | | 345/419 |
| 2017/0147064 A1* | 5/2017 | Yang | H04L 67/131 |
| 2018/0130257 A1* | 5/2018 | Moran | G06F 16/9537 |
| 2019/0295330 A1* | 9/2019 | Nagy | G06T 19/20 |
| 2021/0043116 A1* | 2/2021 | Menguy | G06T 11/203 |
| 2021/0217245 A1* | 7/2021 | Akman | A63H 27/12 |
| 2021/0297461 A1* | 9/2021 | Athwal | G06Q 20/22 |
| 2021/0304450 A1* | 9/2021 | Smith | G02B 27/0172 |
| 2021/0306386 A1* | 9/2021 | Smith | H04L 65/1096 |
| 2022/0092861 A1* | 3/2022 | Sharma | H04W 4/025 |
| 2022/0131948 A1* | 4/2022 | Al Majid | H04L 51/42 |
| 2022/0408445 A1* | 12/2022 | Sun | H04B 7/0486 |

\* cited by examiner

SYSTEMS AND METHODS FOR ASSISTING USERS OF ARTIFICIAL REALITY PLATFORMS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
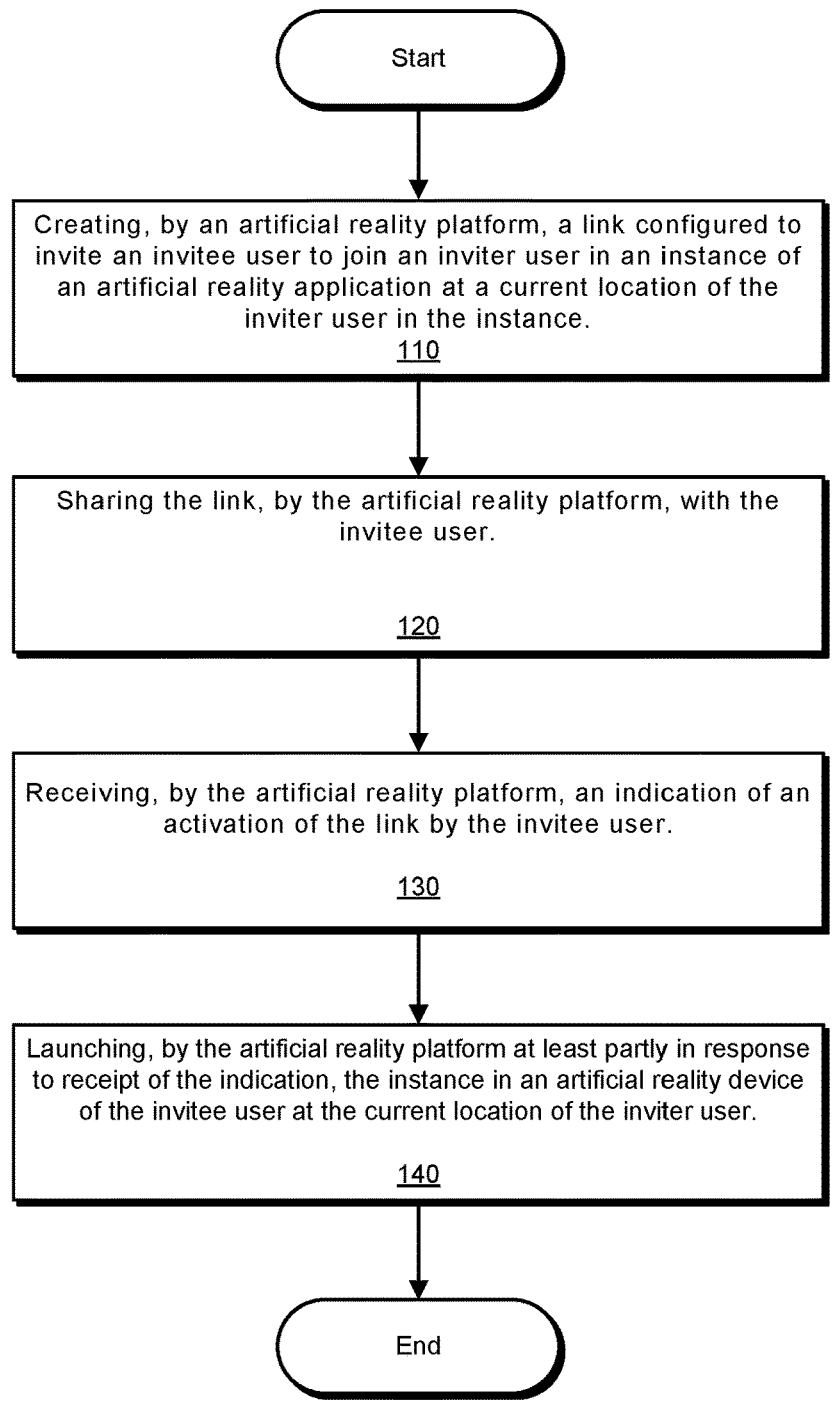
FIG. 1 is a flow diagram of an exemplary method for assisting users of artificial reality platforms in issuing and responding to invitations to meet and interact in an instance of an artificial reality application at a current location of an inviter user.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Artificial reality platforms offer various locations, such as real, geographic locations and/or virtual locations, in which users may interact. For example, users may interact virtually with one another in proximity to a geographic landmark, such as the Eiffel Tower. Additionally, users may interact as a team or as opponents in a virtual battlefield or arena. Also, while the users may be physically located at disparate geographic locations, they may have a virtual and/or augmented reality experience together, such as by playing a game together, spectating an event, and/or visiting with one another.

Artificial reality platforms often need to create multiple instances at a same location with a virtual. For example, the platform may have too many users trying to visit a virtual geographic landmark or virtual event at a same time, and thus create multiple instances of an artificial reality application at that location to accommodate multiple audiences at a same event or location. Additionally, an instance may be user-specific to provide a private experience for a user. However, when there are multiple instances of an application at a same location, users may encounter difficulties in trying to meet and interact at the location using the artificial reality platform. Users moving about a virtual world to different locations, instances, or even applications may encounter similar difficulties.

The present disclosure is generally directed to systems and methods for assisting users of artificial reality platforms. For example, the systems and methods may assist users in issuing and responding to invitations to meet and interact (e.g., in an instance at a location). As will be explained in greater detail below, embodiments of the present disclosure may be implemented in artificial reality platform software that enables a first user to create a link. This link may be to an instance of an artificial reality application and the user's current (e.g., actual or prospective) location in that instance. Optionally, the link may include a voice channel. The first user may share this link with a second, offline user by any social or messaging channel (e.g., messenger app, email, SMS, etc.). The platform may limit link visibility to friends of the first user as a security measure.

The second, offline user may interact with the link to launch a browser that navigates to a webpage that presents the offline user with an option to select an artificial reality hardware option available to the user (e.g., one or multiple artificial reality headsets). Upon selecting a headset and equipping the selected headset, if the first user is still in artificial reality, the platform may present the second user an option to join the first user. For example, the second user may join an instance of the artificial reality application at a current location of the first user. If the current instance and/or location is different from the first user's current instance and/or location at the time the link was created, then the platform may expire the instance/location part of the link, and the instance/location part of the link may dynamically redirect to the new current instance/location of the first user.

The platform may also present the second user with an option to join the voice channel, if available. If the first user is no longer in artificial reality and the voice channel is available, the platform may present the second user with an option to join the voice channel to further coordinate with the first user. If the second user is in artificial reality at the time the link is created, sent, and/or received, the artificial reality platform may intercept the link and present the second user with the options described above. In this way, online and offline users are enabled to coordinate meetings in artificial reality in a dynamic way that adjusts for movement of an online user in artificial reality between application instances and/or locations, and/or change of online status of a user.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-7, detailed descriptions of systems and methods for assisting users of artificial reality platforms in issuing and responding to invitations to meet and interact in an instance of an artificial reality application at a current location of an inviter user. For example, an example method of operation for an artificial reality platform is described with reference to FIG. 1. Additionally, example artificial reality platforms are described with reference to FIGS. 2 and 3. Also, example implementations for assisting offline users are described with reference to FIGS. 4 and 5. Further, examples of artificial reality system hardware are described with reference to FIGS. 6 and 7.

FIG. 1 is a flow diagram of an exemplary computer-implemented method 100 for assisting users of artificial reality platforms. The steps shown in FIG. 1 may be performed by any suitable computer-executable code and/or computing system, including the system(s) illustrated in FIGS. 2 and 3. In one example, each of the steps shown in FIG. 1 may represent an algorithm whose structure includes and/or is represented by multiple sub-steps, examples of which will be provided in greater detail below.

As illustrated in FIG. 1, a method 100 of assisting users of artificial reality platforms begins at step 110. The systems described herein may perform step 110 in a variety of ways. In one example, step 110 may include creating, by an artificial reality platform, a link configured to invite an invitee user to join an inviter user in an instance of an artificial reality application at a current location of the inviter user in the instance. For example, the link may provide an identifier (ID) of the inviter user that informs the invitee user of an identity of the inviter user and allows the artificial reality platform to confirm presence of the inviter user in the instance at the current location. Additionally, the link may provide an ID of the artificial reality application that distinguishes the artificial reality application from other artificial reality applications having one or more instances at the current location. Also, the link may provide an ID of the current location and an ID of the instance of the artificial reality application. The ID of the instance may be configured to allow the invitee user to distinguish between multiple instances of the artificial reality application at the current location and join the instance at the current location in which the artificial reality platform has confirmed that the inviter user is present. Further, the link may provide a connection to a persistent voice channel. Processing may proceed from step 110 to step 120.

As used herein, the term "artificial reality platform" may generally refer to a physical infrastructure that provides artificial reality services utilizing a combination of hardware and software. For example, the term "artificial reality platform" may refer, without limitation, to a set of software and a surrounding ecosystem of resources that provides a realistic simulation of an environment, including three-dimensional graphics, by a computer system using interactive software and hardware. Example hardware may include servers and/or headsets of various configurations, such as those described herein with reference to FIGS. 6 and 7.

As used herein, the term "link" may generally refer to a reference to data that the user can follow in one or more ways. For example, the term "link" may refer, without limitation, to a reference to data that the user can follow by clicking, tapping, selecting, or otherwise interacting with the link. Alternatively or additionally, the term "link" may refer, without limitation, to information that the user can employ to navigate to or search for the data. Example data may be textual data and/or instructions, a webpage that displays additional links, arguments and one or more calls to one or more computerized procedures that cause a user to join an instance, etc.

As used herein, the term "invite" may generally refer to issuing a request for the presence or participation of an invitee user. For example, the term "invite" may refer, without limitation, to communication of a link to an invitee user in any suitable manner, such as by a messaging channel, a social media channel, a voice channel, a chat interface within an artificial reality platform, or any other mode of communication capable of accomplishing delivery to an invitee user.

As used herein, the term "invitee user" may generally refer to a user of the virtual reality platform who receives the link. For example, the term "invitee user" may refer, without limitation, to a friend of the inviter user who receives the link by any suitable communication channel. At the time the link is shared to the invitee user, the invitee user may be online or offline with respect to the artificial reality platform. If offline, the invitee user may receive the link on a non-artificial reality device by a social media channel or a messaging channel. If online, the invitee user's artificial reality headset may display the link using, for example, a chat interface of the virtual reality platform.

As used herein, the term "join" may generally refer to becoming a member of a group of users having privileges to access an instance of a virtual reality application at a given location. For example, the term "join" may refer, without limitation, to becoming part of a team, becoming a participant, becoming a spectator, or otherwise entering the given instance in the artificial reality environment. An invitee user may have the same or different privileges as the inviter user.

As used herein, the term "inviter user" may generally refer to a user of the virtual reality platform who creates the link. For example, the term "inviter user" may refer, without limitation, to a user already present in an instance of a virtual reality application at a given location at a time the link is created. In such a case, the platform may create the link using information about the application, instance, and current location of the inviter user. Alternatively, the inviter user may be offline at the time of link creation. In such a case, the inviter user may select an application and location, and the platform may initially set the location to null, indicate that the location is not yet assigned or to be determined, or assign a reservation ID. Similarly, an inviter user who is online may create a link to a different location and/or application to be joined at a later time, perhaps contingent on participation of an invitee user.

As used herein, the term "instance" may generally refer to a case or occurrence of something. For example, the term "instance" may refer, without limitation, to an element, a document type, a document that conforms to a particular data type definition, an object, a class, etc. In cloud computing, "instance" may refer to a server operating as a virtual machine that runs the virtual reality application for a user or a set of users who have a shared virtual reality experience and interact with one another in the virtual reality environment.

As used herein, the term "artificial reality application" may generally refer to software that performs specific tasks in providing an artificial reality environment for one or more users. For example, the term "artificial reality application" may refer, without limitation, to software useful for accomplishing a computer-generated, interactive, three-dimensional environment for one or more users. Example applications include software applications that digitally simulate a virtual or augmented environment for education, architectural and urban design, digital marketing and activism, engineering and robotics, entertainment, virtual communities, fine arts, healthcare and clinical therapies, heritage and archaeology, occupational safety, social science, and psychology.

As used herein, the term "current location" may generally refer to particular place or position, whether real, virtual, augmented, or combinations thereof. For example, the term "current location" may refer, without limitation, to a geotag, physical address, or landmark placename (e.g., corresponding to a real, geographic location), a placename corresponding to a virtual location (e.g., a gaming battlefield, a room of conferencing software, etc.), a virtual descriptor (e.g., a level of a game), etc. In some cases, a location may correspond to combinations of the above, such as a room number and/or table number at a physical address (e.g., an operating room in a hospital). For the location to be current, it may correspond to a location of the inviter user at the time the link is created, a location at which the inviter user wishes to meet the invitee user in the future, and/or a dynamically updated location that has changed due to movement of the inviter user or future, planned movement (e.g., a travel route, a next level, a selection made to designate a new meeting point, etc.).

The systems described herein may perform step 120 in a variety of ways. In one example, step 120 may include sharing the link, by the artificial reality platform, with the invitee user. For example, the inviter user may be located at a first location in the instance at a time of creation of the link at step 110, and the link shared at step 120 may present the current location to the invitee user. However, the inviter user may have moved to a second location in the instance by a time of the presentation. In this case, step 120 may include updating the current location of the link so that the current location presented to the invitee user by the link may correspond to the second location.

Also, step 120 may include determining, by the artificial reality platform, that the invitee user is not currently connected to the artificial reality platform. In this circumstance, the artificial reality platform may share the link by a channel of a non-artificial reality device of the invitee user in response to the determination. The channel used to share the link may be, for example, a messaging channel or a social media channel, and/or the link may be configured to launch a webpage from which the invitee user is enabled to link directly into the instance. Further, step 120 may include determining, by the artificial reality platform, that the invitee user is currently connected to the artificial reality platform. In this case, the artificial reality platform may share the link by the artificial reality device of the invitee user in response to the determination. Processing may proceed from step 120 to step 130.

As used herein, the term "sharing" may generally refer to electronic distribution or communication. For example, the term "sharing" may refer, without limitation, to transmission over a messaging channel, a social media channel, a chat interface, etc. The distribution may be restricted to groups or individuals, such as friends or a selected friend of the inviter user. A shared link may also expire in whole or in part, such as in response to expiration of a given amount of time, the inviter user joining the instance or leaving the instance, or going offline, etc. A link application, instance, or location may expire, for example, while a voice channel portion of the link may remain active so that the users may coordinate further.

The systems described herein may perform step 130 in a variety of ways. In one example, step 130 may include receiving, by the artificial reality platform, an indication of an activation of the link by the invitee user, and the platform may respond to receipt of this indication in a variety of ways. For example, step 130 may include connecting the inviter user to the persistent voice channel in response to receipt of the indication. Also, in the case that it is determined, at step 130, that the invitee user is not currently connected to the artificial reality platform, the activation may provide a selection by the invitee user to employ the artificial reality device of the invitee user to join the inviter user in the instance at the current location. Thus, the invitee user may have multiple artificial reality devices available to affect the connection to the artificial reality platform, such as multiple registered devices and/or multiple devices detected to be in a vicinity of the invitee user. Activation of the link by the invitee user may cause a prompt to be displayed for selection of one of the aforementioned devices. The received indication may, thus, include information regarding the invitee user selection of a particular one of multiple artificial reality devices. Processing may proceed from step 130 to step 140.

As used herein, the term "indication" may generally refer to anything that indicates user interaction with the link. For example, the term "indication" may refer, without limitation, to any electronic sign, token, or information generated or received by the artificial reality platform that is indicative of user activation of the link or interaction with the link. In one example, the indication may be generated automatically when the invitee user clicks on the link. In another example, the indication may be information obtained via the link and input by the invitee user in navigating to an instance/location, information obtained via the link and input by the invitee user in providing credentials for accessing the instance/location, etc.

As used herein, the term "activation" may generally refer to any type of interaction of the invitee user with the link. For example, the term "activation" may refer, without limitation, to receipt of the link, viewing of information provided by the link, selecting the link (e.g., clicking, tapping, performing voice selection, etc.). In some contexts, the activation may involve opening the link to launch a webpage and make a further selection, such as a particular artificial reality device available to the invitee user.

The systems described herein may perform step 140 in a variety of ways. In one example, step 140 may include launching, by the artificial reality platform at least partly in response to receipt of the indication, the instance in an artificial reality device of the invitee user at the current location of the inviter user. For example, the inviter user may be located at a first location in the instance at a time of creation of the link at step 110, and step 140 may include detecting, by the artificial reality platform, that the inviter user has moved to a second location in the instance by another time of the launch of the instance. In this case, step 140 may include updating the current location of the inviter user to the second location, thereby causing the current location at which the instance is initially launched in the artificial reality device of the invitee user to correspond to the second location.

Also, step 140 may include detecting, by the artificial reality platform, connection to the artificial reality platform by the invitee user employing the artificial reality device (e.g., the selected device as reported in the indication received at step 130). In such a case, the artificial reality platform may launch the instance in the artificial reality device at least partly in response to the detection. For example, the platform may cause the link to be presented to the invitee user in the user's artificial reality headset upon connection to the platform, and the user may interact with the link again to cause the launch to occur. Thus, the launch may occur in response to both receipt of the indication and the detected connection. After step 140, processing may end. Alternatively, processing may return from step 140 to any of steps 110-130.

As used herein, the term "launching" may generally refer to the opening and/or execution of a program or task. For example, the term "launching" may refer, without limitation, to causing the artificial reality application to load and run, authorizing the invitee user to enter a particular instance of the VR application, causing the invitee user to change applications, instances, and/or locations, etc.

As used herein, the term "artificial reality device" may generally refer to any type of hardware, or combination of hardware and software, capable of generating an artificial reality environment. For example, the term "artificial reality device" may refer, without limitation, to a virtual reality headset or augmented reality headset, such as those described herein with reference to FIGS. 6 and 7.

Figure 2:
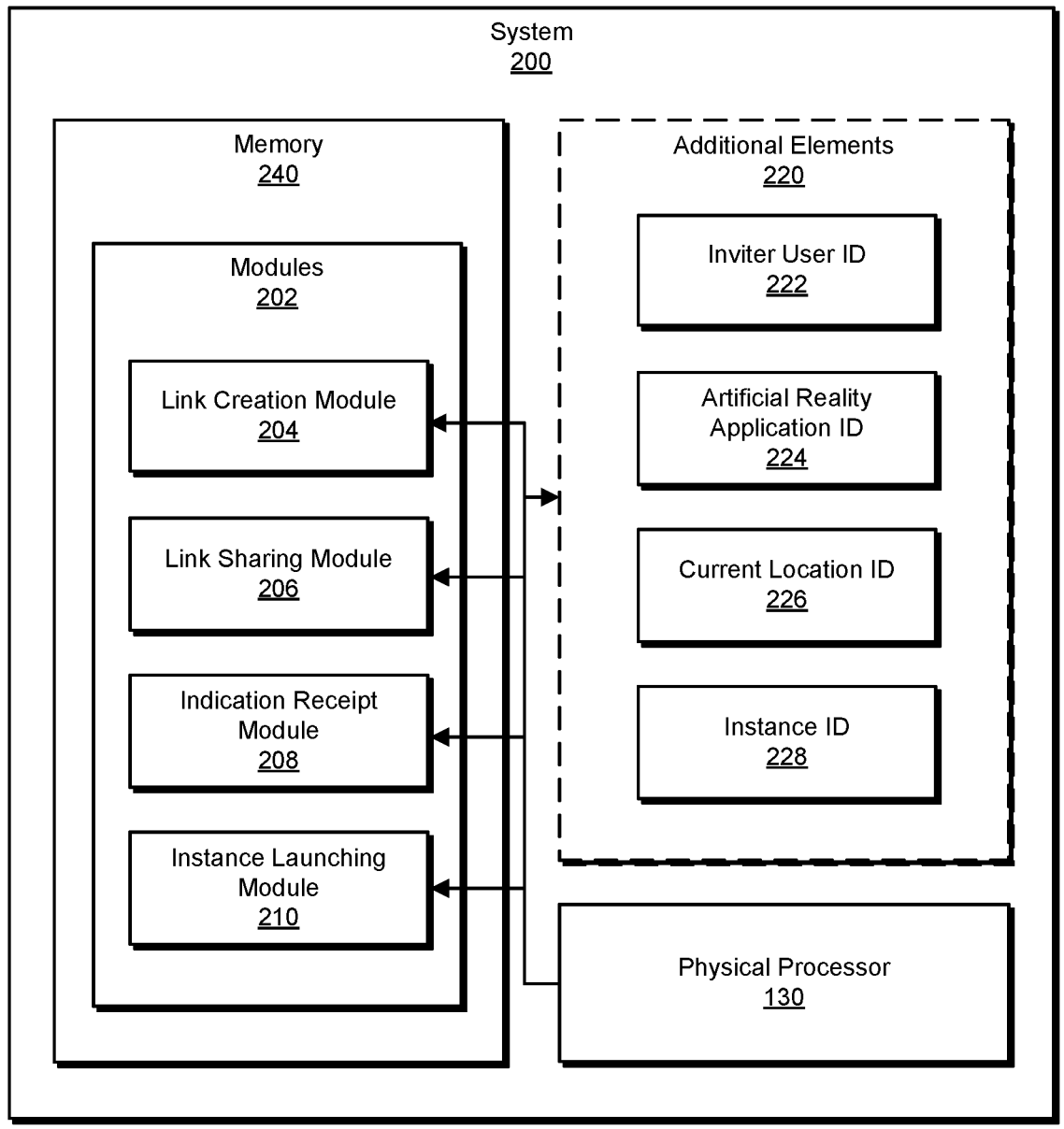
FIG. 2 is a system block diagram illustrating an artificial reality platform configured to assist users of artificial reality platforms in issuing and responding to invitations to meet and interact in an instance of an artificial reality application at a current location of an inviter user.

An artificial reality platform system may be implemented in any suitable manner. Turning to FIG. 2, an exemplary system 200 includes at least one physical processor 230, physical memory 240 comprising computer-executable instructions such as modules 202, and additional elements 220, such as an inviter user identity 222, an artificial reality application identity 224, a current location identity 226, and an instance identity 228. When executed by the physical processor 230, the modules 202 cause physical processor 230 to carry out various operations. For example, link creation module 204 may execute procedures described above with reference to step 110 of method 100 of FIG. 1. Additionally, link sharing module 206 may execute procedures described above with reference to step 120 of method 100 of FIG. 1. Also, indication receipt module 208 may execute procedures described above with reference to step 130 of method 100 of FIG. 1. Further, instance launching module 210 may execute procedures described above with reference to step 140 of method 100 of FIG. 1. Further still, modules 204-210 may perform additional operations as detailed below with reference to FIGS. 4 and 5.

Figure 3:
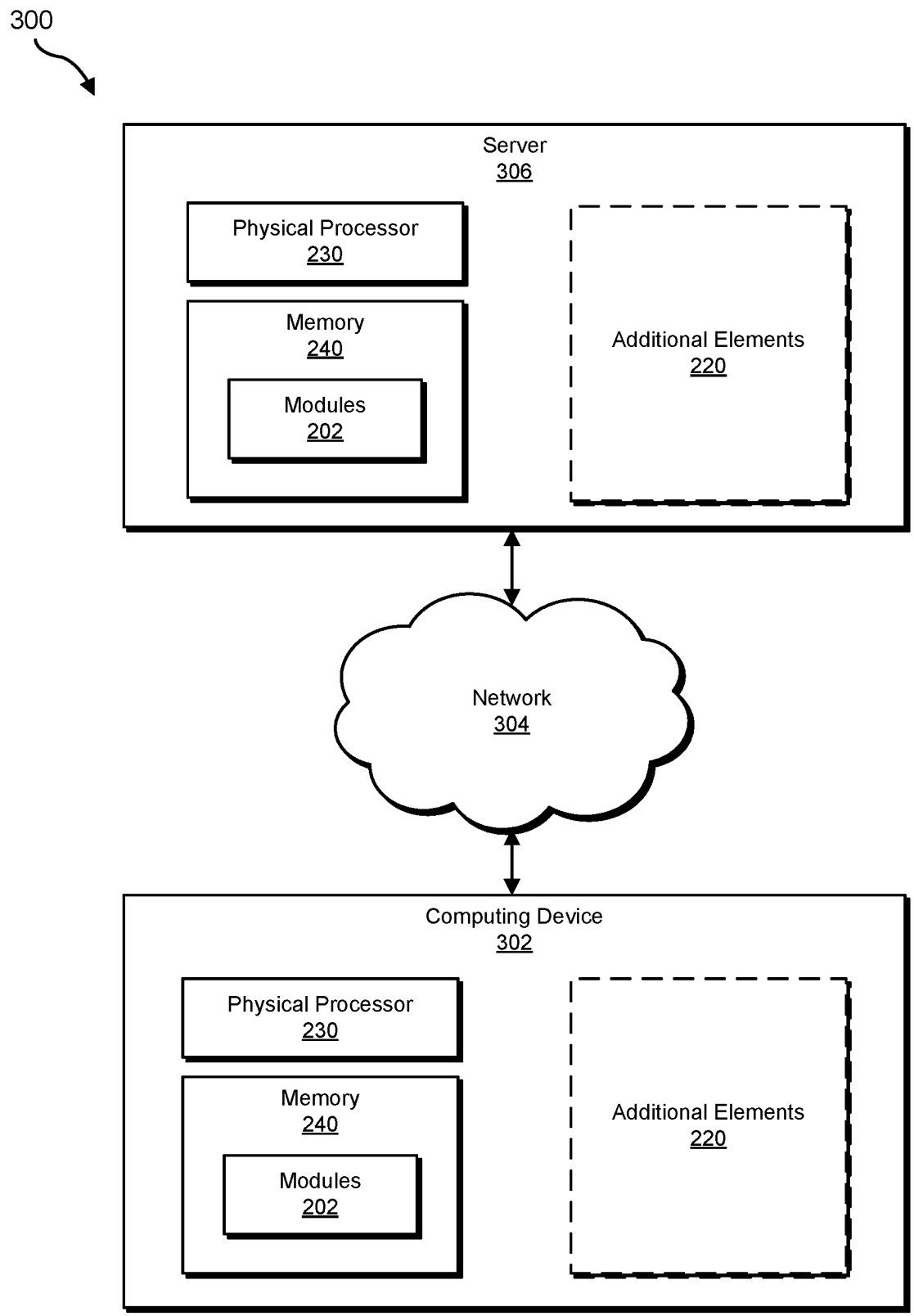
FIG. 3 is a block diagram illustrating a network implementation of an artificial reality platform configured to assist users of artificial reality platforms in issuing and responding to invitations to meet and interact in an instance of an artificial reality application at a current location of an inviter user.

Example system 200 in FIG. 2 may be implemented in a variety of ways. For example, all or a portion of example system 200 may represent portions of example system 300 in FIG. 3. As shown in FIG. 3, system 300 may include a computing device 302 in communication with a server 306 via a network 304. In one example, all or a portion of the functionality of modules 202 may be performed by computing device 302, server 306, and/or any other suitable computing system. As will be described in greater detail below, one or more of modules 202 from FIG. 2 may, when executed by at least one processor of computing device 302 and/or server 306, enable computing device 302 and/or server 306 to perform artificial reality platform functions. For example, and as will be described in greater detail below, one or more of modules 202 may cause computing device 302 and/or server 306 to assist users in issuing and responding to invitations to meet and interact in an instance of an artificial reality application at a current location of an inviter user.

Figure 4:
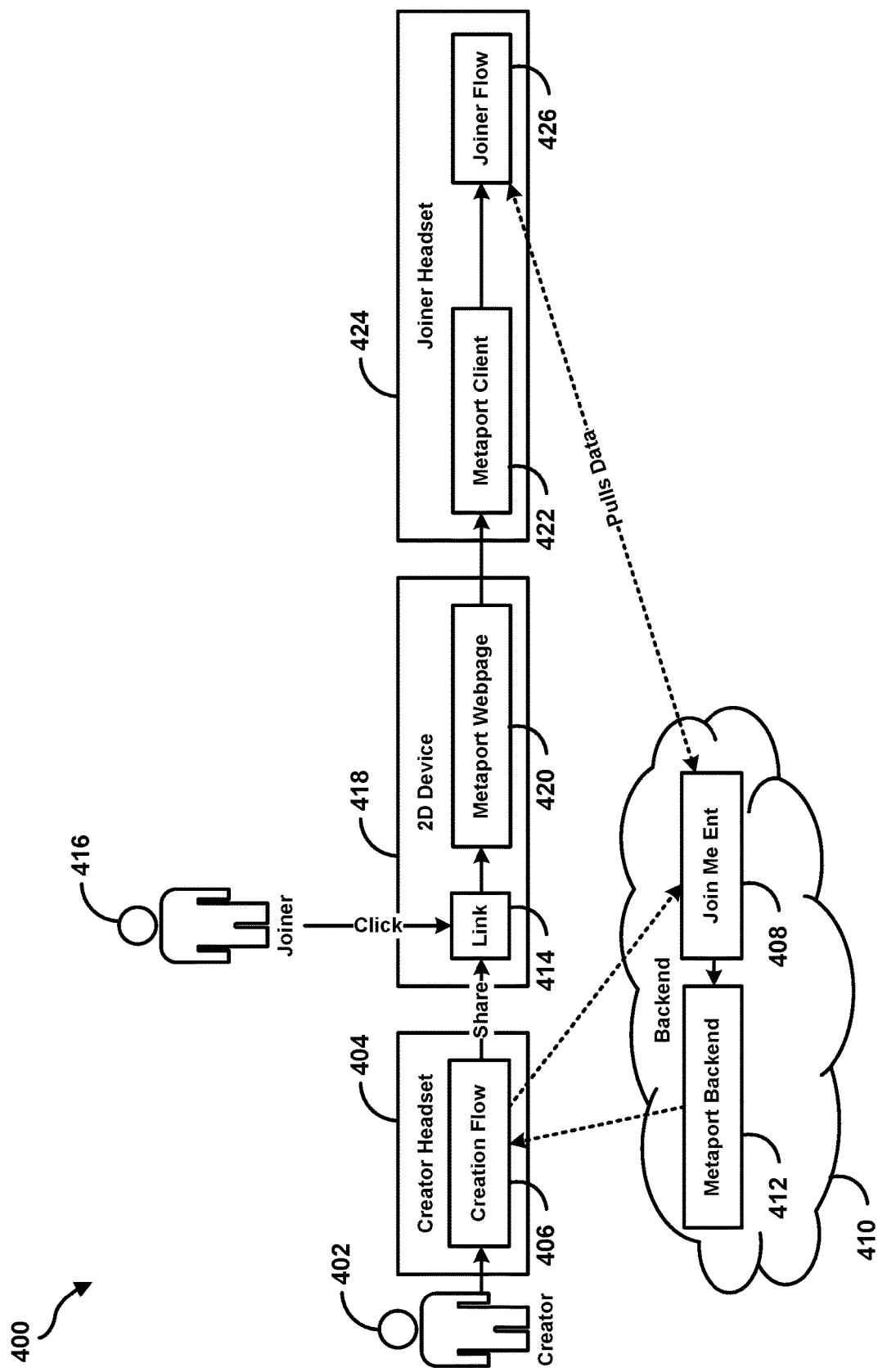
FIG. 4 is a block diagram illustrating an example implementation of an artificial reality platform configured to assist users in issuing and responding to invitations to meet and interact in an instance of an artificial reality application at a current location of an inviter user.

Turning to FIG. 4, an example implementation of an artificial reality platform 400 is configured to assist users in issuing and responding to invitations to meet and interact in an instance of an artificial reality application at a current location of an inviter user. For example, an inviter user 402 may already be connected to the artificial reality platform and using a creator headset 404 to enjoy an artificial reality experience in an instance of an artificial reality application at a current location. Using a creation flow feature 406 provided by headset 404, inviter user 402 may cause generation of a join me entitlement name table (ENT) 408 that may be transmitted to and stored by backend 410 of the artificial reality platform 400. As previously described, ENT 408 may contain an inviter user ID, an application ID, an instance ID, and a current location ID. Optionally, ENT 408 may also contain a party ID that identifies a voice channel.

A metaport backend 412 may use ENT 408 to generate a link 414 and return it to the inviter user 402 using creator headset 404. Inviter user 402 may thus share link 414 to an invitee user 416 (e.g., using a messaging channel or a social media channel) by a non-artificial reality device of invitee user 416. Invitee user 414 may click link 414 to open a webpage 416 that prompts invitee user to select an artificial reality device to join inviter user 402 in the artificial reality environment. In response to selection of joiner headset 424, a metaport client 422 may be opened in joiner headset 424 when it is powered on and connected to the artificial reality platform 400. Metaport client 422 may provide a joiner flow feature 426 in joiner headset 424, and joiner flow feature 426 may pull data from ENT 408 stored on backend 410 to insert invitee user into the instance in which inviter user 402 is currently located. Empowering invitee user 416 to select a particular artificial reality device advantageously avoids issues that may arise in such devices being shared with multiple users.

Figure 5:
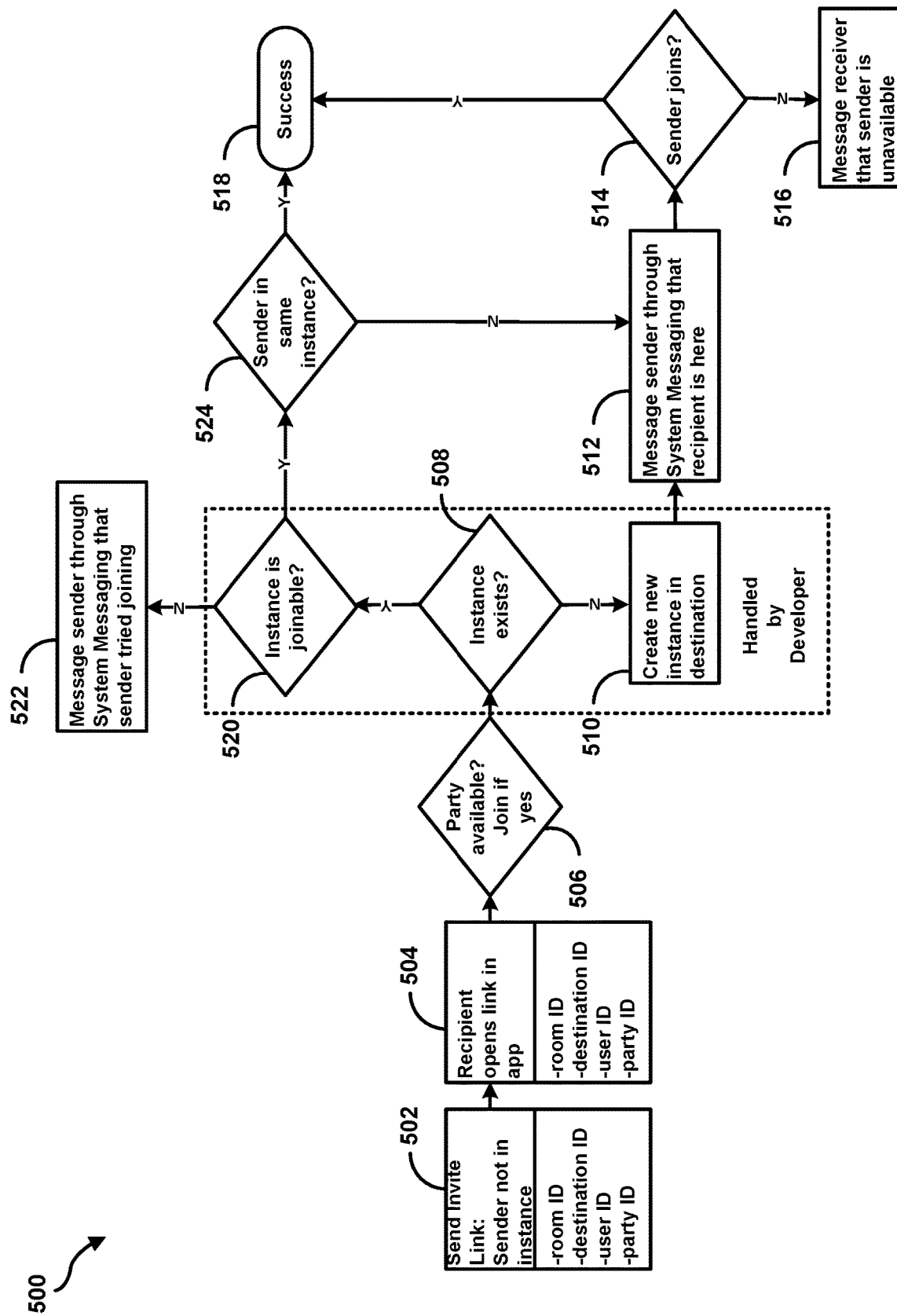
FIG. 5 is a flow diagram illustrating an example implementation of an artificial reality platform configured to assist offline users in issuing and responding to invitations to meet and interact in an instance of an artificial reality application at a current location of an inviter user.

Turning to FIG. 5, an example operational process 500 of an artificial reality platform assists offline users in issuing and responding to invitations to meet and interact in an instance of an artificial reality application at a current location of an inviter user. Beginning at 502, process 500 may start with an inviter user sending a link to an invitee user. As previously described, the link may include various types of information, such as a room ID, destination ID, user ID, and party ID. At 504, the invitee user may open the received link in an application, such as a messaging application or a social media application. At 506, a determination may be made in response to the invitee user opening the link. For example, if it is determined that a voice channel corresponding to the party ID is available, then the invitee user may join the voice channel.

At 508, another determination may be made in response to the invitee user opening the link. For example, if it is determined that the instance corresponding to the instance ID does not yet exist, then the platform may respond at 510 by creating a new instance at the destination ID. In response to creation of the instance, a message may be provided, to the inviter user at 512, as a notification that the invitee user has arrived. At 514, the inviter user may select whether or not the join the instance. Then, if the inviter user does not join the instance at 514, then a message may be provided, to the invitee user at 518, as a notification that the inviter user is not available. Otherwise, if the inviter user joins the instance at 514, then the process 500 may successfully end at 518.

If a determination is made, at 508, that the instance already exists, then another determination may be made, at 520, whether the instance is joinable. If it is determined, at 520, that the instance is not joinable, then a message may be sent, at 522, to the inviter user that the invitee user tried to join. Otherwise, if it is determined, at 520, that the instance is joinable, then another determination may be made, at 524, whether the inviter user is in the instance. If it is determined, at 524, that the user is in the instance, then the process 500 may successfully end at 518. Otherwise, if it is determined, at 524, that the user is not in the instance, then processing may proceed to 512 for further operations.

The preceding description has detailed systems and methods for assisting users of artificial reality platforms. As detailed above, artificial reality platform software enables a first user to create a link to an instance of an artificial reality application. The link may lead to the user's current (e.g., actual or prospective) location in that instance. Optionally, the link may include a persistent voice channel that is independent of the artificial reality application so that it can be used for coordination of offline users. The first user may share this link with a second, offline user by any social or messaging channel (e.g., messenger app, email, SMS, etc.). The platform may limit link visibility to friends of the first user as a security measure.

The second, offline user may interact with the link to launch a browser that navigates to a webpage that presents the offline user with an option to select an artificial reality hardware option available to the user (e.g., one or multiple artificial reality headsets). Upon selecting a headset and equipping the selected headset, if the first user is still in the instance, the platform may present the second user with an option to join the instance at a current location of the first user. If the current instance and/or location is different from the first user's current instance and/or location at the time the link was created, then the platform may expire the instance/location part of the link, and the instance/location part of the link may dynamically redirect to a new current instance/location of the first user. The platform may also present the second user with an option to join the voice channel, if available.

If the first user is no longer in artificial reality and the voice channel is available, the platform may present the second user with an option to join the voice channel to further coordinate with the first user. If the second user is in artificial reality at the time the link is created, sent, and/or received, the artificial reality platform may intercept the link and present the second user with the options described above. In this way, online and offline users are enabled to coordinate meetings in artificial reality in a dynamic way that adjusts for movement of an online user in artificial reality between application instances and/or locations, and/or change of online status of a user.

EXAMPLE EMBODIMENTS

Example 1: A computer-implemented method may include creating, by an artificial reality platform, a link configured to invite an invitee user to join an inviter user in an instance of an artificial reality application at a current location of the inviter user in the instance, sharing the link, by the artificial reality platform, with the invitee user, receiving, by the artificial reality platform, an indication of an activation of the link by the invitee user, and launching, by the artificial reality platform at least partly in response to receipt of the indication, the instance in an artificial reality device of the invitee user at the current location of the inviter user.

Example 2: The method of example 1, wherein the inviter user is located at a first location in the instance at a time of creation of the link, the method further including detecting, by the artificial reality platform, that the inviter user has moved to a second location in the instance by another time of the launch of the instance, and updating the current location of the inviter user to the second location, thereby causing the current location at which the instance is initially launched in the artificial reality device of the invitee user to correspond to the second location.

Example 3: The method of ay of examples 1 or 2, wherein the link presents the current location to the invitee user, the inviter user has moved to a second location in the instance by a time of the presentation, and the current location presented to the invitee user by the link corresponds to the second location.

Example 4: The method of any of examples 1-3, wherein the link provides an identifier (ID) of the inviter user that informs the invitee user of an identity of the inviter user and allows the artificial reality platform to confirm presence of the inviter user in the instance at the current location, an ID of the artificial reality application that distinguishes the artificial reality application from other artificial reality applications having one or more instances at the current location, an ID of the current location, and an ID of the instance of the artificial reality application, wherein the ID of the instance allows the invitee user to distinguish between multiple instances of the artificial reality application at the current location and join the instance at the current location in which the artificial reality platform has confirmed that the inviter user is present.

Example 5: The method of any of examples 1-4, wherein the link provides a connection to a persistent voice channel, the method further including connecting the inviter user to the persistent voice channel in response to receipt of the indication.

Example 6: The method of any of examples 1-5, further including determining, by the artificial reality platform, that the invitee user is not currently connected to the artificial reality platform, wherein the artificial reality platform shares the link by a channel of a non-artificial reality device of the invitee user in response to the determination.

Example 7: The method of any of examples 1-6, wherein the activation provides a selection by the invitee user to employ the artificial reality device of the invitee user to join the inviter user in the instance at the current location.

Example 8: The method of any of examples 1-7, further including detecting, by the artificial reality platform, connection to the artificial reality platform by the invitee user employing the artificial reality device, wherein the artificial reality platform launches the instance in the artificial reality device at least partly in response to the detection.

Example 9: The method of any of examples 1-8, wherein the channel is at least one of a social media channel or a messaging channel.

Example 10: The method of any of examples 1-9, wherein the link is configured to launch a webpage from which the invitee user is enabled to link directly into the instance.

Example 11: The method of any of examples 1-10, further including determining, by the artificial reality platform, that the invitee user is currently connected to the artificial reality platform, wherein the artificial reality platform shares the link by the artificial reality device of the invitee user in response to the determination.

Example 12: A system may include at least one physical processor and physical memory including computer-executable instructions that, when executed by the physical processor, cause the physical processor to: create, by an artificial reality platform, a link configured to invite an invitee user to join an inviter user in an instance of an artificial reality application at a current location of the inviter user in the instance; share the link, by the artificial reality platform, with the invitee user; receive, by the artificial reality platform, an indication of an activation of the link by the invitee user; and launch, by the artificial reality platform at least partly in response to receipt of the indication, the instance in an artificial reality device of the invitee user at the current location of the inviter user.

Example 13: The system of claim 12, wherein the inviter user is located at a first location in the instance at a time of creation of the link, wherein the computer-executable instructions further cause the physical processor to: detect, by the artificial reality platform, that the inviter user has moved to a second location in the instance by another time of the launch of the instance; and update the current location of the inviter user to the second location, thereby causing the current location at which the instance is initially launched in the artificial reality device of the invitee user to correspond to the second location.

Example 14: The system of any of examples 12 or 13, wherein the link provides: an identifier (ID) of the inviter user that informs the invitee user of an identity of the inviter user and allows the artificial reality platform to confirm presence of the inviter user in the instance at the current location; an ID of the artificial reality application that distinguishes the artificial reality application from other artificial reality applications having one or more instances at the current location; an ID of the current location; and an ID of the instance of the artificial reality application, wherein the ID of the instance allows the invitee user to distinguish between multiple instances of the artificial reality application at the current location and join the instance at the current location in which the artificial reality platform has confirmed that the inviter user is present.

Example 15: The system of any of examples 12-14, wherein the computer-executable instructions further cause the physical processor to determine, by the artificial reality platform, that the invitee user is not currently connected to the artificial reality platform, wherein the artificial reality platform shares the link by a channel of a non-artificial reality device of the invitee user in response to the determination.

Example 16: The system of any of examples 12-15, wherein the computer-executable instructions further cause the physical processor to determine, by the artificial reality platform, that the invitee user is currently connected to the artificial reality platform, wherein the artificial reality platform shares the link by the artificial reality device of the invitee user in response to the determination.

Example 17: A non-transitory computer-readable medium including one or more computer-executable instructions that, when executed by at least one processor of a computing device, cause the computing device to: create, by an artificial reality platform, a link configured to invite an invitee user to join an inviter user in an instance of an artificial reality application at a current location of the inviter user in the instance; share the link, by the artificial reality platform, with the invitee user; receive, by the artificial reality platform, an indication of an activation of the link by the invitee user; and launch, by the artificial reality platform at least partly in response to receipt of the indication, the instance in an artificial reality device of the invitee user at the current location of the inviter user.

Example 18: The non-transitory computer-readable medium of example 17, wherein the inviter user is located at a first location in the instance at a time of creation of the link, wherein the computer-executable instructions further cause the computing device to: detect, by the artificial reality platform, that the inviter user has moved to a second location in the instance by another time of the launch of the instance; and update the current location of the inviter user to the second location, thereby causing the current location at which the instance is initially launched in the artificial reality device of the invitee user to correspond to the second location.

Example 19: The non-transitory computer-readable medium of any of examples 17 or 18, wherein the link provides: an identifier (ID) of the inviter user that informs the invitee user of an identity of the inviter user and allows the artificial reality platform to confirm presence of the inviter user in the instance at the current location; an ID of the artificial reality application that distinguishes the artificial reality application from other artificial reality applications having one or more instances at the current location; an ID of the current location; and an ID of the instance of the artificial reality application, wherein the ID of the instance allows the invitee user to distinguish between multiple instances of the artificial reality application at the current location and join the instance at the current location in which the artificial reality platform has confirmed that the inviter user is present.

Example 20: The non-transitory computer-readable medium of any of examples 17-19, wherein the computer-executable instructions further cause the computing device to determine, by the artificial reality platform, that the invitee user is not currently connected to the artificial reality platform, wherein the artificial reality platform shares the link by a channel of a non-artificial reality device of the invitee user in response to the determination.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 600 in FIG. 6) or that visually immerses a user in an artificial reality (such as, e.g., virtual-reality system 700 in FIG. 7). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
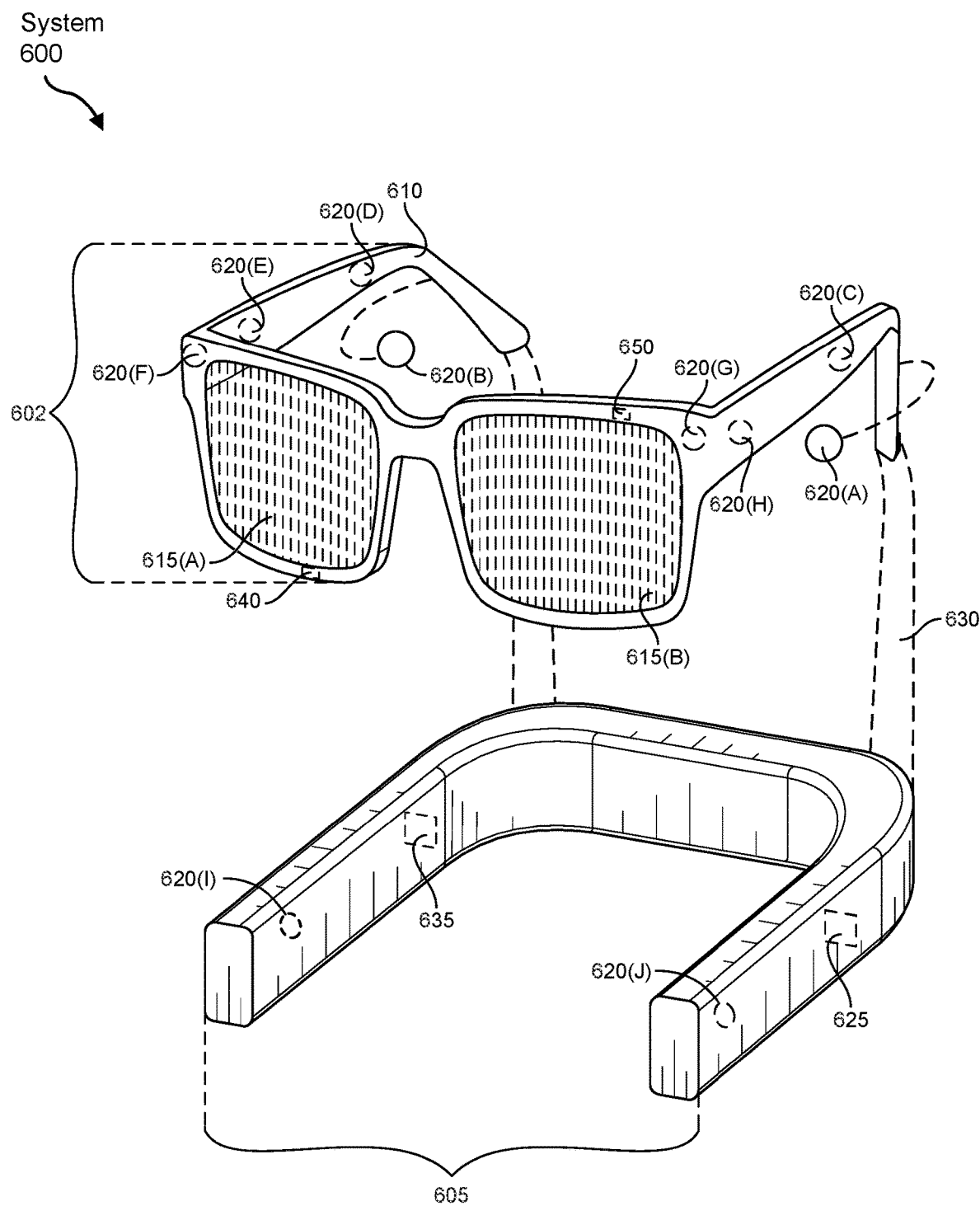
FIG. 6 is an illustration of exemplary augmented-reality glasses that may be used in connection with embodiments of this disclosure.
Figure 7:
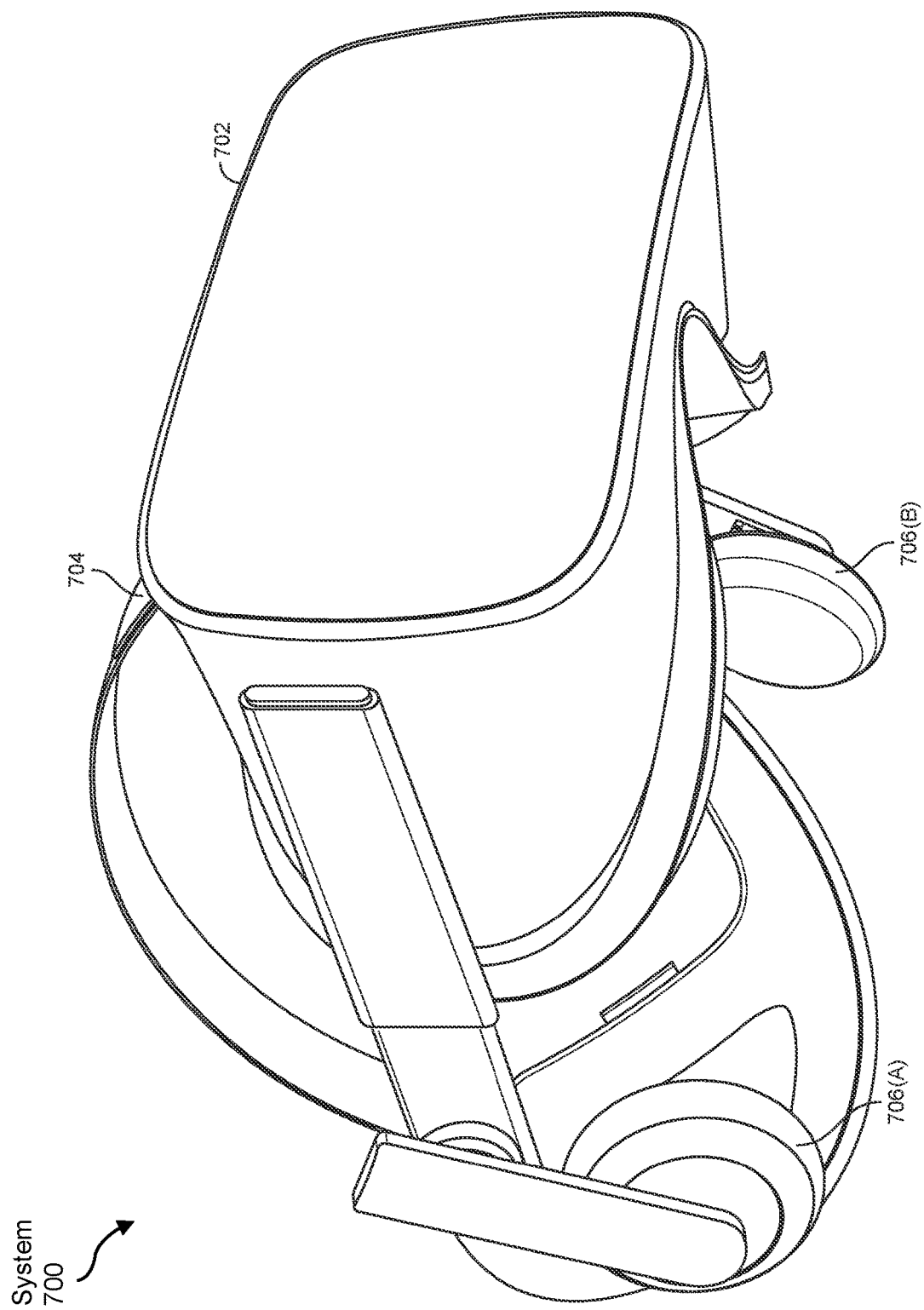
FIG. 7 is an illustration of an exemplary virtual-reality headset that may be used in connection with embodiments of this disclosure.

Turning to FIG. 6, augmented-reality system 600 may include an eyewear device 602 with a frame 610 configured to hold a left display device 615(A) and a right display device 615(B) in front of a user's eyes. Display devices 615(A) and 615(B) may act together or independently to present an image or series of images to a user. While augmented-reality system 600 includes two displays, embodiments of this disclosure may be implemented in augmented-reality systems with a single NED or more than two NEDs.

In some embodiments, augmented-reality system 600 may include one or more sensors, such as sensor 640. Sensor 640 may generate measurement signals in response to motion of augmented-reality system 600 and may be located on substantially any portion of frame 610. Sensor 640 may represent one or more of a variety of different sensing mechanisms, such as a position sensor, an inertial measurement unit (IMU), a depth camera assembly, a structured light emitter and/or detector, or any combination thereof. In some embodiments, augmented-reality system 600 may or may not include sensor 640 or may include more than one sensor. In embodiments in which sensor 640 includes an IMU, the IMU may generate calibration data based on measurement signals from sensor 640. Examples of sensor 640 may include, without limitation, accelerometers, gyroscopes, magnetometers, other suitable types of sensors that detect motion, sensors used for error correction of the IMU, or some combination thereof.

In some examples, augmented-reality system 600 may also include a microphone array with a plurality of acoustic transducers 620(A)-620(J), referred to collectively as acoustic transducers 620. Acoustic transducers 620 may represent transducers that detect air pressure variations induced by sound waves. Each acoustic transducer 620 may be configured to detect sound and convert the detected sound into an electronic format (e.g., an analog or digital format). The microphone array in FIG. 6 may include, for example, ten acoustic transducers: 620(A) and 620(B), which may be designed to be placed inside a corresponding ear of the user, acoustic transducers 620(C), 620(D), 620(E), 620(F), 620(G), and 620(H), which may be positioned at various locations on frame 610, and/or acoustic transducers 620(I) and 620(J), which may be positioned on a corresponding neckband 605.

In some embodiments, one or more of acoustic transducers 620(A)-(J) may be used as output transducers (e.g., speakers). For example, acoustic transducers 620(A) and/or 620(B) may be earbuds or any other suitable type of headphone or speaker.

The configuration of acoustic transducers 620 of the microphone array may vary. While augmented-reality system 600 is shown in FIG. 6 as having ten acoustic transducers 620, the number of acoustic transducers 620 may be greater or less than ten. In some embodiments, using higher numbers of acoustic transducers 620 may increase the amount of audio information collected and/or the sensitivity and accuracy of the audio information. In contrast, using a lower number of acoustic transducers 620 may decrease the computing power required by an associated controller 650 to process the collected audio information. In addition, the position of each acoustic transducer 620 of the microphone array may vary. For example, the position of an acoustic transducer 620 may include a defined position on the user, a defined coordinate on frame 610, an orientation associated with each acoustic transducer 620, or some combination thereof.

Acoustic transducers 620(A) and 620(B) may be positioned on different parts of the user's ear, such as behind the pinna, behind the tragus, and/or within the auricle or fossa. Or, there may be additional acoustic transducers 620 on or surrounding the ear in addition to acoustic transducers 620 inside the ear canal. Having an acoustic transducer 620 positioned next to an ear canal of a user may enable the microphone array to collect information on how sounds arrive at the ear canal. By positioning at least two of acoustic transducers 620 on either side of a user's head (e.g., as binaural microphones), augmented-reality device 600 may simulate binaural hearing and capture a 3D stereo sound field around about a user's head. In some embodiments, acoustic transducers 620(A) and 620(B) may be connected to augmented-reality system 600 via a wired connection 630, and in other embodiments acoustic transducers 620(A) and 620(B) may be connected to augmented-reality system 600 via a wireless connection (e.g., a BLUETOOTH connection). In still other embodiments, acoustic transducers 620(A) and 620(B) may not be used at all in conjunction with augmented-reality system 600.

Acoustic transducers 620 on frame 610 may be positioned in a variety of different ways, including along the length of the temples, across the bridge, above or below display devices 615(A) and 615(B), or some combination thereof. Acoustic transducers 620 may also be oriented such that the microphone array is able to detect sounds in a wide range of directions surrounding the user wearing the augmented-reality system 600. In some embodiments, an optimization process may be performed during manufacturing of augmented-reality system 600 to determine relative positioning of each acoustic transducer 620 in the microphone array.

In some examples, augmented-reality system 600 may include or be connected to an external device (e.g., a paired device), such as neckband 605. Neckband 605 generally represents any type or form of paired device. Thus, the following discussion of neckband 605 may also apply to various other paired devices, such as charging cases, smart watches, smart phones, wrist bands, other wearable devices, hand-held controllers, tablet computers, laptop computers, other external compute devices, etc.

As shown, neckband 605 may be coupled to eyewear device 602 via one or more connectors. The connectors may be wired or wireless and may include electrical and/or non-electrical (e.g., structural) components. In some cases, eyewear device 602 and neckband 605 may operate independently without any wired or wireless connection between them. While FIG. 6 illustrates the components of eyewear device 602 and neckband 605 in example locations on eyewear device 602 and neckband 605, the components may be located elsewhere and/or distributed differently on eyewear device 602 and/or neckband 605. In some embodiments, the components of eyewear device 602 and neckband 605 may be located on one or more additional peripheral devices paired with eyewear device 602, neckband 605, or some combination thereof.

Pairing external devices, such as neckband 605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 600 may be provided by a paired device or shared between a paired device and an eyewear device, thus reducing the weight, heat profile, and form factor of the eyewear device overall while still retaining desired functionality. For example, neckband 605 may allow components that would otherwise be included on an eyewear device to be included in neckband 605 since users may tolerate a heavier weight load on their shoulders than they would tolerate on their heads. Neckband 605 may also have a larger surface area over which to diffuse and disperse heat to the ambient environment. Thus, neckband 605 may allow for greater battery and computation capacity than might otherwise have been possible on a stand-alone eyewear device. Since weight carried in neckband 605 may be less invasive to a user than weight carried in eyewear device 602, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 605 may be communicatively coupled with eyewear device 602 and/or to other devices. These other devices may provide certain functions (e.g., tracking, localizing, depth mapping, processing, storage, etc.) to augmented-reality system 600. In the embodiment of FIG. 6, neckband 605 may include two acoustic transducers (e.g., 620(I) and 620(J)) that are part of the microphone array (or potentially form their own microphone subarray). Neckband 605 may also include a controller 625 and a power source 635.

Acoustic transducers 620(I) and 620(J) of neckband 605 may be configured to detect sound and convert the detected sound into an electronic format (analog or digital). In the embodiment of FIG. 6, acoustic transducers 620(I) and 620(J) may be positioned on neckband 605, thereby increasing the distance between the neckband acoustic transducers 620(I) and 620(J) and other acoustic transducers 620 positioned on eyewear device 602. In some cases, increasing the distance between acoustic transducers 620 of the microphone array may improve the accuracy of beamforming performed via the microphone array. For example, if a sound is detected by acoustic transducers 620(C) and 620(D) and the distance between acoustic transducers 620(C) and 620(D) is greater than, e.g., the distance between acoustic transducers 620(D) and 620(E), the determined source location of the detected sound may be more accurate than if the sound had been detected by acoustic transducers 620(D) and 620(E).

Controller 625 of neckband 605 may process information generated by the sensors on neckband 605 and/or augmented-reality system 600. For example, controller 625 may process information from the microphone array that describes sounds detected by the microphone array. For each detected sound, controller 625 may perform a direction-of-arrival (DOA) estimation to estimate a direction from which the detected sound arrived at the microphone array. As the microphone array detects sounds, controller 625 may populate an audio data set with the information. In embodiments in which augmented-reality system 600 includes an inertial measurement unit, controller 625 may compute all inertial and spatial calculations from the IMU located on eyewear device 602. A connector may convey information between augmented-reality system 600 and neckband 605 and between augmented-reality system 600 and controller 625. The information may be in the form of optical data, electrical data, wireless data, or any other transmittable data form. Moving the processing of information generated by augmented-reality system 600 to neckband 605 may reduce weight and heat in eyewear device 602, making it more comfortable to the user.

Power source 635 in neckband 605 may provide power to eyewear device 602 and/or to neckband 605. Power source 635 may include, without limitation, lithium ion batteries, lithium-polymer batteries, primary lithium batteries, alkaline batteries, or any other form of power storage. In some cases, power source 635 may be a wired power source. Including power source 635 on neckband 605 instead of on eyewear device 602 may help better distribute the weight and heat generated by power source 635.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 700 in FIG. 7, that mostly or completely covers a user's field of view. Virtual-reality system 700 may include a front rigid body 702 and a band 704 shaped to fit around a user's head. Virtual-reality system 700 may also include output audio transducers 706(A) and 706(B). Furthermore, while not shown in FIG. 7, front rigid body 702 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 600 and/or virtual-reality system 700 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 600 and/or virtual-reality system 700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 600 and/or virtual-reality system 700 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive user interactions with user selections to be transformed, transform the user selections, output a result of the transformation to determine that the user wishes to launch an instance of an artificial reality application, use the result of the transformation to launch the instance, and store the result of the transformation to enable the user to interact with one or more other users in the instance. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   creating, by an artificial reality platform, a link configured to invite an invitee user to join an inviter user in an instance of an artificial reality application at a current location of the inviter user in the instance;
   sharing the link, by the artificial reality platform, with the invitee user;
   receiving, by the artificial reality platform, an indication of an activation of the link by the invitee user; and
   launching, by the artificial reality platform at least partly in response to receipt of the indication, the instance in an artificial reality device of the invitee user at the current location of the inviter user,
   wherein the link provides an identifier (ID) of the inviter user, an ID of the artificial reality application, an ID of the current location, and an ID of the instance of the artificial reality application.

2. The method of claim 1, wherein the inviter user is located at a first location in the instance at a time of creation of the link, the method further comprising:
   detecting, by the artificial reality platform, that the inviter user has moved to a second location in the instance by another time of the launch of the instance; and
   updating the current location of the inviter user to the second location, thereby causing the current location at which the instance is initially launched in the artificial reality device of the invitee user to correspond to the second location.

3. The method of claim 1, wherein the link presents the current location to the invitee user, the inviter user has moved to a second location in the instance by a time of the presentation, and the current location presented to the invitee user by the link corresponds to the second location.

4. The method of claim 1, wherein:
   the ID of the inviter user informs the invitee user of an identity of the inviter user and allows the artificial reality platform to confirm presence of the inviter user in the instance at the current location;
   the ID of the artificial reality application distinguishes the artificial reality application from other artificial reality applications having one or more instances at the current location; and
   the ID of the instance of the artificial reality application allows the invitee user to distinguish between multiple instances of the artificial reality application at the current location and join the instance at the current location in which the artificial reality platform has confirmed that the inviter user is present.

5. The method of claim 1, wherein the link provides a connection to a persistent voice channel, the method further comprising:
   connecting the inviter user to the persistent voice channel in response to receipt of the indication.

6. The method of claim 1, further comprising:
   determining, by the artificial reality platform, that the invitee user is not currently connected to the artificial reality platform,
   wherein the artificial reality platform shares the link by a channel of a non-artificial reality device of the invitee user in response to the determination.

7. The method of claim 6, wherein the activation provides a selection by the invitee user to employ the artificial reality device of the invitee user to join the inviter user in the instance at the current location.

8. The method of claim 7, further comprising:
   detecting, by the artificial reality platform, connection to the artificial reality platform by the invitee user employing the artificial reality device,
   wherein the artificial reality platform launches the instance in the artificial reality device at least partly in response to the detection.

9. The method of claim 6, wherein the channel is at least one of a social media channel or a messaging channel.

10. The method of claim 9, wherein the link is configured to launch a webpage from which the invitee user is enabled to link directly into the instance.

11. The method of claim 1, further comprising:
    determining, by the artificial reality platform, that the invitee user is currently connected to the artificial reality platform,
    wherein the artificial reality platform shares the link by the artificial reality device of the invitee user in response to the determination.

12. A system comprising:
    at least one physical processor; and
    physical memory comprising computer-executable instructions that, when executed by the physical processor, cause the physical processor to:
      create, by an artificial reality platform, a link configured to invite an invitee user to join an inviter user in an instance of an artificial reality application at a current location of the inviter user in the instance;
      share the link, by the artificial reality platform, with the invitee user;
      receive, by the artificial reality platform, an indication of an activation of the link by the invitee user; and
      launch, by the artificial reality platform at least partly in response to receipt of the indication, the instance in an artificial reality device of the invitee user at the current location of the inviter user, wherein the link provides an identifier (ID) of the inviter user, an ID of the artificial reality application, an ID of the current location, and an ID of the instance of the artificial reality application.

13. The system of claim 12, wherein the inviter user is located at a first location in the instance at a time of creation of the link, wherein the computer-executable instructions further cause the physical processor to:
    detect, by the artificial reality platform, that the inviter user has moved to a second location in the instance by another time of the launch of the instance; and
    update the current location of the inviter user to the second location, thereby causing the current location at which the instance is initially launched in the artificial reality device of the invitee user to correspond to the second location.

14. The system of claim 12, wherein
    the ID of the inviter user informs the invitee user of an identity of the inviter user and allows the artificial reality platform to confirm presence of the inviter user in the instance at the current location;
    the ID of the artificial reality application distinguishes the artificial reality application from other artificial reality applications having one or more instances at the current location; and
    the ID of the instance of the artificial reality application allows the invitee user to distinguish between multiple instances of the artificial reality application at the current location and join the instance at the current location in which the artificial reality platform has confirmed that the inviter user is present.

15. The system of claim 12, wherein the computer-executable instructions further cause the physical processor to:
    determine, by the artificial reality platform, that the invitee user is not currently connected to the artificial reality platform,
    wherein the artificial reality platform shares the link by a channel of a non-artificial reality device of the invitee user in response to the determination.

16. The system of claim 12, wherein the computer-executable instructions further cause the physical processor to:
    determine, by the artificial reality platform, that the invitee user is currently connected to the artificial reality platform,
    wherein the artificial reality platform shares the link by the artificial reality device of the invitee user in response to the determination.

17. A non-transitory computer-readable medium comprising one or more computer-executable instructions that, when executed by at least one processor of a computing device, cause the computing device to:
    create, by an artificial reality platform, a link configured to invite an invitee user to join an inviter user in an instance of an artificial reality application at a current location of the inviter user in the instance;
    share the link, by the artificial reality platform, with the invitee user;
    receive, by the artificial reality platform, an indication of an activation of the link by the invitee user; and
    launch, by the artificial reality platform at least partly in response to receipt of the indication, the instance in an artificial reality device of the invitee user at the current location of the inviter user,
    wherein the link provides an identifier (ID) of the inviter user, an ID of the artificial reality application, an ID of the current location, and an ID of the instance of the artificial reality application.

18. The non-transitory computer-readable medium of claim 17, wherein the inviter user is located at a first location in the instance at a time of creation of the link, wherein the computer-executable instructions further cause the computing device to:
    detect, by the artificial reality platform, that the inviter user has moved to a second location in the instance by another time of the launch of the instance; and
    update the current location of the inviter user to the second location, thereby causing the current location at which the instance is initially launched in the artificial reality device of the invitee user to correspond to the second location.

19. The non-transitory computer-readable medium of claim 17, wherein
    the ID of the inviter user informs the invitee user of an identity of the inviter user and allows the artificial reality platform to confirm presence of the inviter user in the instance at the current location;
    the ID of the artificial reality application distinguishes the artificial reality application from other artificial reality applications having one or more instances at the current location; and
    the ID of the instance of the artificial reality application allows the invitee user to distinguish between multiple instances of the artificial reality application at the current location and join the instance at the current location in which the artificial reality platform has confirmed that the inviter user is present.

20. The non-transitory computer-readable medium of claim 17, wherein the computer-executable instructions further cause the computing device to:
    determine, by the artificial reality platform, that the invitee user is not currently connected to the artificial reality platform,
    wherein the artificial reality platform shares the link by a channel of a non-artificial reality device of the invitee user in response to the determination.

* * * * *